US010986395B2

(12) United States Patent
Wei et al.

(10) Patent No.: US 10,986,395 B2
(45) Date of Patent: Apr. 20, 2021

(54) PARENTAL CONTROL OF CONTENT VIEWING BY CHILDREN USING A REMOTE SMART PHONE

(71) Applicant: INTERDIGITAL CE PATENT HOLDINGS, SAS, Paris (FR)

(72) Inventors: Zhengdong Wei, Beijing (CN); Qianlong Yu, Beijing (CN); Jun Ma, Beijing (CN)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 152 days.

(21) Appl. No.: 14/770,616

(22) PCT Filed: Mar. 29, 2013

(86) PCT No.: PCT/CN2013/073444
§ 371 (c)(1),
(2) Date: Aug. 26, 2015

(87) PCT Pub. No.: WO2014/153772
PCT Pub. Date: Oct. 2, 2014

(65) Prior Publication Data
US 2016/0014444 A1    Jan. 14, 2016

(51) Int. Cl.
*H04N 21/4227*    (2011.01)
*H04N 21/422*    (2011.01)
(Continued)

(52) U.S. Cl.
CPC .... *H04N 21/4227* (2013.01); *H04M 1/72415* (2021.01); *H04N 21/4222* (2013.01);
(Continued)

(58) Field of Classification Search
CPC ............ H04N 21/4227; H04N 5/4403; H04N 21/44204; H04N 21/4222; H04N 21/4334;
(Continued)

(56) References Cited

U.S. PATENT DOCUMENTS 6,662,365 B1    12/2003 Sullivan et al.
2003/0005446 A1*   1/2003 Jaff .................... H04N 7/17318
725/51

(Continued)

FOREIGN PATENT DOCUMENTS

CN    102064985    5/2011
CN    101827196    9/2011
(Continued)

OTHER PUBLICATIONS

International Search Report for PCT/CN2013/073444 dated Dec. 10, 2013.
(Continued)

Primary Examiner — Anthony Bantamoi
(74) Attorney, Agent, or Firm — Invention Mine LLC

(57) ABSTRACT

A method and apparatus for providing remote control of content rendered by a set top box is described including transmitting a state request message by a user to the set top box via a server, receiving a state reply message by the user from the set top box via the server, determining by the user if the user needs to control the set top box responsive to information in the state reply message and transmitting a remote control command to the set top box via the server. Also described are a method and apparatus including recording information of events by the set top box, receiving a state request message via a server, generating a state reply message including the recorded information, transmitting the state reply message via the server, receiving a remote control command via the server and performing an action specified by the remote control command.

20 Claims, 2 Drawing Sheets

(51) Int. Cl.
    *H04M 1/725*     (2021.01)
    *H04N 21/442*     (2011.01)
    *H04N 21/433*     (2011.01)
    *H04N 21/222*     (2011.01)
    *H04N 21/45*     (2011.01)
    *H04M 1/72415*     (2021.01)

(52) U.S. Cl.
    CPC ... *H04N 21/42204* (2013.01); *H04N 21/4334* (2013.01); *H04N 21/442* (2013.01); *H04N 21/44204* (2013.01); *H04N 21/2221* (2013.01); *H04N 21/42206* (2013.01); *H04N 21/4532* (2013.01)

(58) Field of Classification Search
    CPC ....... H04N 2005/4444; H04N 21/2221; H04N 21/442; H04N 21/42204; H04N 21/4532; H04N 21/42206; H04M 1/72533
    See application file for complete search history.

(56) References Cited

U.S. PATENT DOCUMENTS

| | | | |
|---|---|---|---|
| 2003/0110500 A1* | 6/2003 | Rodriguez | H04N 7/16 |
| 2006/0080408 A1* | 4/2006 | Istvan | H04N 7/16 |
| 2006/0179468 A1* | 8/2006 | Pearson | H04N 5/44543 |
| | | | 725/110 |
| 2006/0218575 A1* | 9/2006 | Blair | H04L 63/10 |
| | | | 725/28 |
| 2008/0163330 A1* | 7/2008 | Sparrell | H04N 7/16 |
| 2009/0064268 A1 | 3/2009 | Straub | |
| 2009/0172757 A1* | 7/2009 | Aldrey | H04N 7/173 |
| 2010/0211604 A1* | 8/2010 | Campbell | H04M 3/42093 |
| | | | 707/780 |
| 2010/0328547 A1* | 12/2010 | Mayorga | G06F 13/385 |
| | | | 348/734 |
| 2011/0150432 A1* | 6/2011 | Paul | H04L 65/4084 |
| | | | 386/297 |
| 2011/0209177 A1* | 8/2011 | Sela | H04N 7/17318 |
| | | | 725/39 |
| 2011/0298596 A1* | 12/2011 | Warrick | G06F 21/305 |
| | | | 340/12.53 |
| 2015/0089523 A1* | 3/2015 | Volovich | H04N 21/23103 |
| | | | 725/14 |

FOREIGN PATENT DOCUMENTS

| | | |
|---|---|---|
| WO | WO2010151696 | 12/2010 |
| WO | WO2012033669 | 3/2012 |

OTHER PUBLICATIONS

International Search Report and Written Opinion of the International Searching Authority for PCT/CN2013l073444, dated Jan. 9, 2014, 11 pages.

\* cited by examiner

US 10,986,395 B2

PARENTAL CONTROL OF CONTENT VIEWING BY CHILDREN USING A REMOTE SMART PHONE

This application claims the benefit, under 35 U.S.C. § 365 of International Application PCT/CN2013/073444, filed Mar. 29, 2013, which was published in accordance with PCT Article 21(2) on Oct. 2, 2014 in English.

FIELD OF THE INVENTION

The present invention relates to using a remote smart phone to accomplish parent control of content (program) viewing by a child or children.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system. The present invention is not limited to a conventional TV but may also be used to control content (programs) rendered on a computing device via the Internet.

Set top boxes could provide rich content and popular/fashionable services to home users because they have capabilities to interface with some device within the internet. For some digital video broadcast (DVB) programs, there is a parental control descriptor in the event information table (EIT) to suggest an appropriate age level for viewing the content (program). This could prevent young children from seeing some adult programs (content). A similar function has been provided in some conditional access (CA) systems. Concerning the healthy growth of children and protecting their eyesight, some parents want a way to know the playing time of their set top box and to control its capability when they are out of the home.

SUMMARY OF THE INVENTION

When the parents are out of the home and leave their children at home alone, they may not want their children watch TV for an extended period of time, or only allow the children to see (view) special programs of a channel at a special time or for a specific time period (duration).

Using only the currently available mechanisms of CA or EIT or channel lock, this desire/requirement cannot be fulfilled. The present invention described herein provides a complete solution to implement this feature by using a remote smart phone to monitor and control the set top box (STB).

Three modules are necessary. The modules may be implemented as hardware, software, firmware or any combination thereof and may be implemented using reduced instruction set computers (RISCs), application specific integrated circuits (ASICs) and/or field programmable gate arrays (FPGAs) or any equivalent technology. One module (CLIENT-STB) will be in (be executed on) the STB. A second module (SERVER) will be in (be executed on) the broadcast server. The third module (CONTROLLER) will be in (be executed on) the personal smart phone. A smart phone as used herein is an example, but the present invention is not so limited and the term smart phone may also include a laptop or notebook computer, an iPad, an iPod, an iPhone, a tablet computing device or any other equivalent mobile computing device.

A method and apparatus for providing remote control of content rendered by a set top box is described including transmitting a state request message by a user to the set top box via a server, receiving a state reply message by the user from the set top box via the server, determining by the user if the user needs to control the set top box responsive to information in the state reply message and transmitting a remote control command to the set top box via the server. Also described are a method and apparatus for providing remote control of content rendered by an addressed set top box including receiving a state request message for the addressed set top box from a user, locating the addressed set top box, forwarding the state request message to the located set top box, receiving a state reply message from the located set top box, forwarding the state reply message to the user, receiving a remote control command for the located set top box from the user and forwarding the remote control command to the located set top box. Also described are a method and apparatus for providing remote control of content rendered by a set top box including recording information of events by the set top box, receiving a state request message from a user via a server, generating a state reply message including the recorded information, transmitting the state reply message to the user via the server, receiving a remote control command from the user via the server and performing an action specified by the remote control command.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
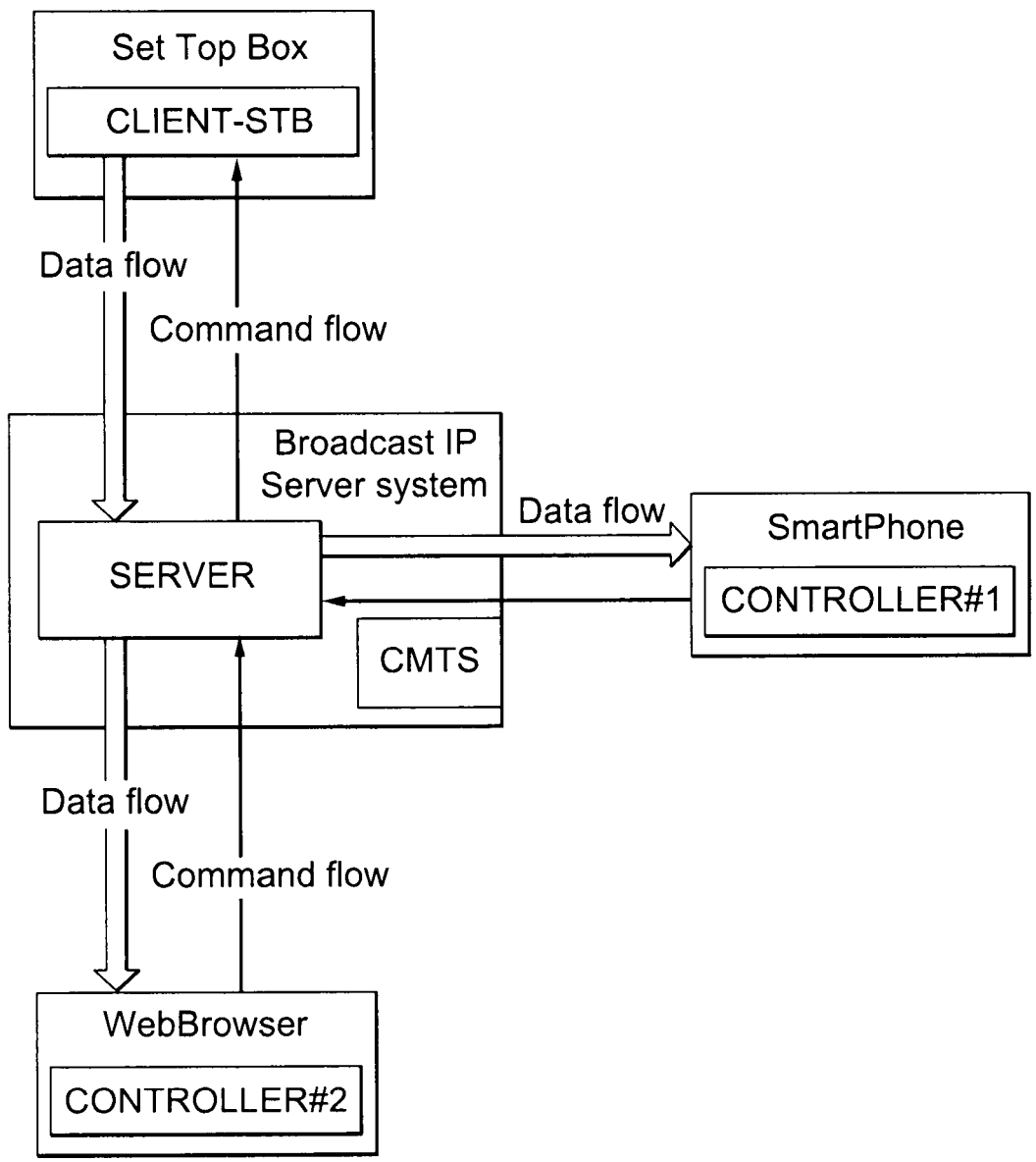
FIG. 1 is a block diagram of an exemplary embodiment of the modules of the present invention.

The CLIENT-STB module would be embedded in STB. The CLIENT-STB module could transmit (send)/receive to/from the SERVER module via a cable modem or Ethernet port. The CLIENT-STB module records and updates the set top box state including running time duration, all program names and playing time duration of content (programs) that the set top box rendered in the most recent three days. The CLIENT-STB module transmits (sends) the recorded state to the SERVER module if requested to do so. The CLIENT-STB module is able to lock all channels in the set top box or turn the set top box off when it receives such a command from the SERVER module.

The SERVER module is implemented in the broadcast computer which could communicate with all devices on line directly or indirectly via a cable modem termination system (CMTS). Devices include set top boxes, the CONTROLLER module in a remote parental control device and a web browser used as a remote parental control device. The SERVER module could receive a request from the smart phone via the internet or browser client with http. The SERVER module could locate the specified box using the specified user login name. The SERVER module requests and receives the state of the specified box via its IP address. The SERVER module could send the command to specified STB to ask it to turn itself off or lock itself.

The CONTROLLER module is implemented in a smart phone or a service that the SERVER module provides on a web browser of a smart phone or other computing device. The remote user (parent) could get all information about the state of the STB via the CONTROLLER module in the remote user's smart phone or web page hosting this service. The user could turn off the STB or lock all channels of the STB via CONTROLLER module or web browser service. The command is sent to SERVER module and executed finally in the CLIENT-STB module.

Before details of the present invention are described further below are the three basic command types and structures.

1. State_Request

| Syntax | Num of byte | Value | Comment |
|---|---|---|---|
| STB_State_request( ){ | | | |
| magic | 4 | 0x4b494453 | "KIDS" |
| version | 1 | 0x0 | Protocol version |
| Registered_user_name | 16 | | User name of the owner of the set top box |

2. State_Reply

| Syntax | Num of byte | Value | Comment |
|---|---|---|---|
| STB_Run_State( ){ | | | |
| magic | 4 | 0x 4b494453 | "KIDS" |
| version | 1 | 0x0 | Protocol version |
| MAC_address | 4 | | MAC address of the set top box |
| Registered_user_name | 16 | | User name of the owner of the set top box |
| Current_state | 1 | 0 or 1 | 0-standby, 1-awake |
| Boot_time | 4 | Utc time | The set top box boot time |
| Runing_time_length | 4 | | Second count from boot to now |
| View_program_info_length | 4 | | Viewed program information length with byte |
| For(i=0;i<N; i++){ | | | |
| Event_name_length | 1 | <0xff | The length of event name |
| Event_name | Event name length | | The name of the viewed/rendered/played program |
| Service_id | 2 | 1~0xffff | The DVB service ID that event is within; |
| Service_name_length | 1 | | The name length of the service |
| Service_name | Service name length | | |
| View_start_time | 4 | Utc time | The time that the set top box started to play/render this event; |
| View_end_time | 4 | Utc time | The time that the set top box stopped playing/rendering this event; |
| Event_content_level | 1 | <0xff | The event maturity level or type |
| } | | | |
| Check_sum | 4 | | Check sum value |
| } | | | |

3. Remote_Control_Cmd

| Syntax | Num of byte | Value | Comment |
|---|---|---|---|
| STB_Controller( ){ | | | |
| magic | 4 | 0x 4b494453 | "KIDS" |
| version | 1 | 0x0 | Protocol version |
| Registered_user_name | 16 | | User name of the owner of the set top box |
| Ctrl_command | 1 | 0, 1, 2, 0xFF | 0--turn off/stand by, 1--lock all channels; 2--lock current channel. 0xFF—reset previous command state. |
| validity | 4 | 0 or number | 0—for ever from now on; Number—time length by second. |

4. Remote_Control_Cmd_Ack

| Syntax | Num of byte | Value | Comment |
|---|---|---|---|
| STB_cmd_ack( ){ | | | |
| magic | 4 | 0x 4b494453 | "KIDS" |
| version | 1 | 0x0 | Protocol version |
| MAC_address | 4 | | MAC address of the set top box |
| Registered_user_name | 16 | | User name of the owner of the set top box |
| Cmd_result | 1 | 0 or 1 | 0-failure, 1-succeed |

A "state request" message is issued to a set top box by the CONTROLLER module in a user's remote smart phone.

The "state request" message is actually received by the SERVER module in the server and forwarded to the set top box (CLIENT STB module) by the SERVER module. The user must provide the user's name who is the registered owner of the set top box. It is assumed that the user is the authorized user of the smart phone. The web browser version may require additional verification such as a password, security questions or biometric data. This may have been initiated by a user at a smart phone or via a web browser.

The CLIENT-STB module in set top box replies with a "state reply" message which provides the status of the set top box. Status includes the medium access control (MAC) address of the set top box, the user name of the owner of the set top box, the current state of the set top box (0=standby and 1=awake), the time that the set top box was booted (started up), the time in seconds since the set top box was last booted (started) up, the length of the program (content) that has been viewed (played, rendered), the name (title) of each event (program, content) viewed, the length (duration) of each event (program, content), the service from which the event (program, content) was received (e.g., Netflix™, M-go™ (Trademark of Technicolor), etc.), the time that the set top box started to play (render) the event (program, content), the time that the set top box ceased playing (rendering) the event (program, content), and the content level (rating, maturity level). The "state reply' from the set top box (CLIENT STB module) is received by the SERVER module of the server and forwarded by the SERVER module of the server to the CONTROLLER module of the user's smart phone (for the user) or a CONTROLLER module in a web browser service (for the user).

Based on the "state reply" the user may issue a remote control command to the set top box. The user issues such a remote control command via the CONTROLLER module in the user's smart phone or via a CONTROLLER module of a web browser service. The remote control command is received by the SERVER module of the server and forwarded to the set top box (CLIENT-STB module). The control command options are to turn off the set top box, to lock all channels of the set top box, to lock the current channel being viewed of the set top box, or to reset to cancel previous command. Each command sent to CLIENT-STB module has its validity checked, which will ensure that the command (request, message) is valid. The validity value 0 means the STB will keep the status after execute current command forever. The reset command is used to recover the STB status.

After the STB executes the remote command, the CLIENT-STB module will send its reply as remote_control_cmd_ack msg to the SERVER module, which message is then transferred to the CONTROLLER module. The user thus knows that the remote control command was executed (performed, finished, completed). One exception is the turn off command option. The CLIENT-STB module has to send out remote_control_cmd_ack after it is in stand-by mode and before the set top box turns itself off.

Once the STB is awakened again by the child in the home, the previous command is still valid if its validity has not expired. So there is a case that the STB could not be awakened up any longer due to the previous command (standby option, validity='0'). The user could cancel the previous command in order to recover the STB with a reset option in the remote control command when this case occurs or the user wants to use the STB without any limitation when the user returns home. The user must install the CONTROLLER module in the user's smart phone. The set top box is interfaced via the Internet with its Ethernet port directly.

Sometimes a user wants to know how long a time his/her child has been watching (viewing) TV in the home. The following could clearly show the use case. The message process and protocol of network and transport layers are ignored for purposes of the following description. It should be noted that a user cannot control what his/her child might be watching (viewing) while at a friend's home. The flip side of the present invention is that the user may be controlling what a friend of the child is watching at the user's home.

Figure 2:
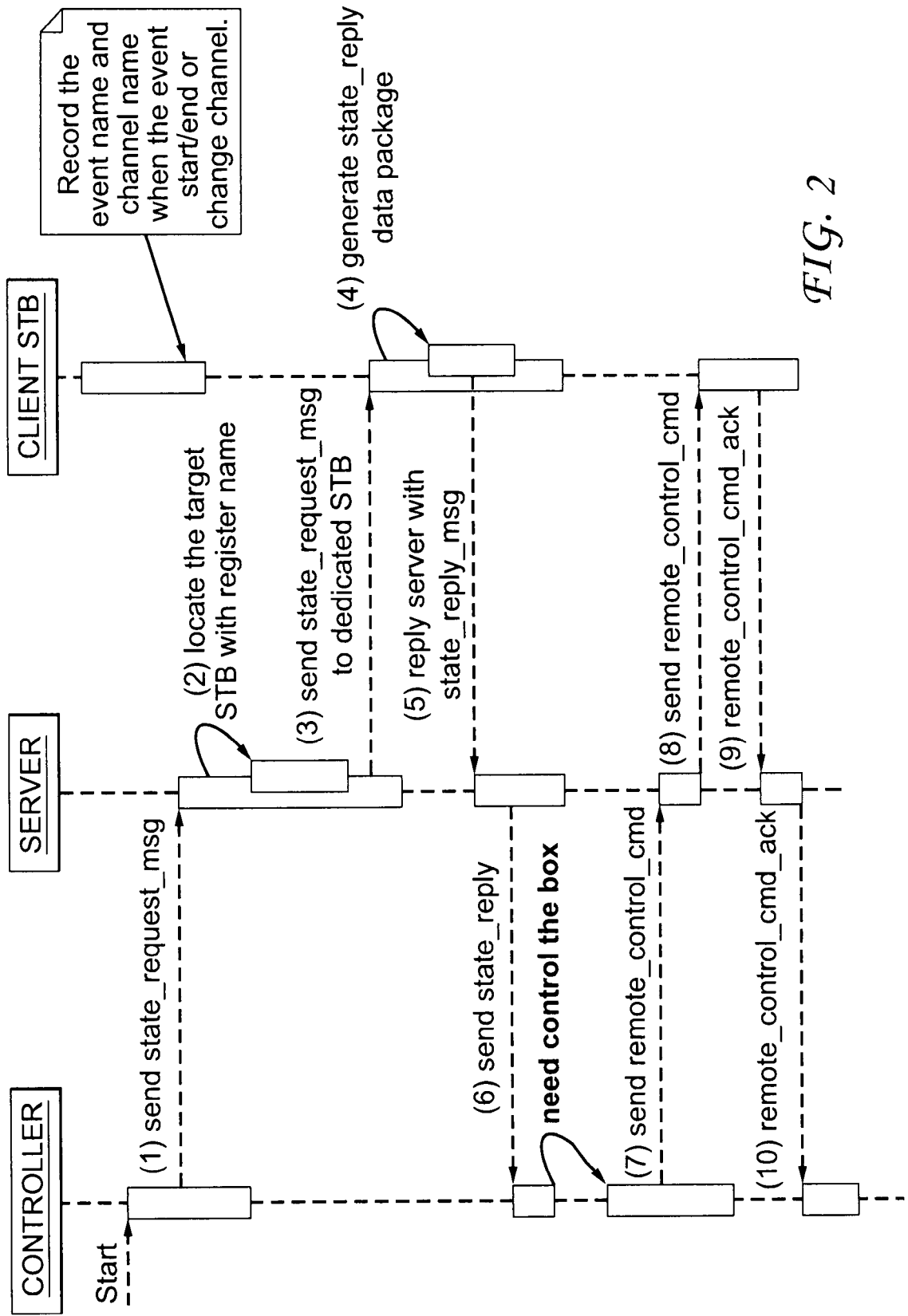
FIG. 2 is a ladder diagram of the function and order of the interaction of the various modules of an exemplary embodiment of the present invention.

Referring to FIG. 2, the CONTROLLER module may be installed in a user's smart phone or be accessed via a web browser that is part of, and supported by, the server. In the case where the user is accessing the control system of the present invention via the user's smart phone, it is assumed that the user is in control of his/her smart phone and no verification is required. In the case where the user is accessing the control system of the present invention via a web browser then the user may be required to login and provide a password, answer security questions or provide biometric data for verification. Steps (acts) (1), (6), and (7) may be performed via the CONTROLLER module in a user's smart phone or via a CONTROLLER module via a web browser.

At step (1) the user via one of the CONTROLLER modules transmits (sends) a state request message (state_request msg) to the SERVER module of the server. At step (2) the SERVER module of the server locates the target set top box using the registration name provided in the state request message. The SERVER module of the server searches for the target set top box using the user name of the registered set top box owner provided by the user in the state request message. The SERVER locates the target set top box's internet protocol (IP) and MAC address. At step (3) the SERVER module of the server transmits (sends, forwards) the state request message to the target set top box. The SERVER module accomplishes step (3) by encapsulating the state request message as an IP packet and sends (transmits, forwards) the IP packet to the target set top box. At step (4) the CLIENT-STB module of the target set top box generates a state reply message (state_reply msg) with all of its state information. At step (5) the CLIENT-STB module of the set top box replies (transmits, sends) to the SERVER module of the server with the state reply message having the state information contained therein. At step (6) the SERVER module of the server transmits (sends, forwards) the state reply message to the user via one of the CONTROLLER modules. The user makes a determination based on the state reply message if he/she needs to control the set top box. If the user does not wish to control the set top box then the method of the present invention ends at this point. If the user determines that he/she needs to control the set top box based on the state reply message then at step (7) the user via one of the CONTROLLER modules transmits (sends, forwards) a remote control command (remote_control cmd) to the SERVER module of the server (destined for the target set top box). Upon receipt of the remote control command from the user, the SERVER module of the server transmits (sends, forwards) the remote control command to the CLIENT STB module of the set top box. The command options are to turn the set top box off completely, to lock all channels of the set top box or to lock the current channel being viewed on the set top box, or to reset the box to its normal state so as to cancel the previous command. Once the CLIENT-STB module finishes (completes) the command action or before it turns itself off, at step (9) it will send remote control command acknowledgement which will be received by user via the CONTROLLER module at step (10).

If the set top box is connected to the WLAN directly, then steps (3), (5) and (8) will be in the internet network. If the set top box can only communicate with the CMTS by cable modem, then steps (3), (5) and (8) will be transmitted (forwarded, sent) in the cable network with fixed up/down frequencies.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for providing remote control of content rendered by a processing device, said method comprising:
    transmitting a state request message from a controller in a mobile device to said processing device via a content provider server, said state request message requesting a status of said processing device;
    receiving a state reply message at said controller in said mobile device from said processing device via said content provider server,
    wherein said state reply message provides the status of said processing device;
    determining if there needs to be control of said processing device responsive to information in said state reply message,
    wherein determining if there needs to be control of said processing device comprises selecting a remote control parental control command via said controller in said mobile device to control said processing device responsive to information in said state reply message;
    transmitting said remote control parental control command by said controller in said mobile device to said processing device via said content provider server;
    receiving an acknowledgement at said controller in said mobile device including status of said remote control parental control command; and
    maintaining the remote control parental control command until a reset option is selected on the mobile device.

2. The method of claim 1, wherein the state reply message further comprises a validity status indicator indicating whether the state request message was determined to be valid.

3. The method of claim 2, further comprising:
    determining the validity of the state request message; and
    discarding the state request message when the validity is determined to be invalid.

4. The method of claim 1, wherein the remote control parental control command comprises at least one of turn off, stand by, lock all channels, lock current channel, and reset previous command state.

5. A method for providing remote control of content rendered by an addressed processing device, said method comprising:
    receiving a state request message from a controller in a mobile device for said addressed processing device via a content provider server, said state request message requesting a status of said addressed processing device;
    locating said addressed processing device;
    forwarding said state request message to said located processing device via said content provider server;
    receiving a state reply message from said located processing device via said content provider server,
    wherein said state reply message provides the status of said processing device;
    forwarding said state reply message to said controller in said mobile device via said content provider server;
    receiving a remote control parental control command from said controller in said mobile device for said located processing device via said content provider server; and
    forwarding said remote control parental control command to said located processing device via said content provider server;
    receiving an acknowledgement of status of completion of said remote control parental control command from said located processing device;
    forwarding said acknowledgement of status of completion of said remote control command to said controller in said mobile device; and
    maintaining the remote control parental control command until a reset option is selected on the mobile device.

6. The method of claim 5, further comprising:
    determining a validity of the state request message; and
    sending, to the controller in the mobile device, information indicating the determined validity.

7. The method of claim 5, wherein the remote control parental control command comprises at least one of turn off, stand by, lock all channels, lock current channel, and reset previous command state.

8. A method for providing remote control of content rendered by a processing device, said method comprising:
    recording information of events by said processing device;
    receiving a state request message from a controller in a mobile device via a content provider server, said state request message requesting a status of said processing device;
    generating a state reply message including said recorded information and status of said processing device;
    transmitting said state reply message to said controller in said mobile device via said content provider server;

receiving a remote control parental control command from said controller in said mobile device via said content provider server;

performing an action specified by said remote control parental control command;

transmitting an acknowledgement to said controller in said mobile device including status of performance of said action specified by said remote control parental control command via said content provider server; and maintaining the remote control parental control command until a reset option is selected on the mobile device.

9. The method according to claim 8, wherein said recorded information includes event names, channel names, event start times, event end times.

10. The method of claim 8, further comprising:
determining a validity of the state request message; and
sending, to the controller in the mobile device, information indicating the determined validity.

11. The method of claim 8, wherein the remote control parental control command comprises at least one of turn off, stand by, lock all channels, lock current channel, and reset previous command state.

12. A mobile device for providing remote control of content rendered by a processing device, the mobile device comprising a processor and a memory storing a controller module, which controller module when executed causes the processor to:

transmit a state request message to said processing device via a content provider server, said state request message requesting a status of said processing device;

receive a state reply message from said processing device via said content provider server, wherein said state reply message provides a status of said processing device;

determine if there needs to be control of said processing device responsive to information in said state reply message, wherein determining if there needs to be control of said processing device comprises selecting a remote control parental control via said controller in said mobile device to control said processing device responsive to information in said state reply message;

transmit a remote control parental control command to said processing device via said content provider server;

receive an acknowledgement including status of said remote control parental control command, wherein the remote control parental control command is maintained until a reset option is selected on the mobile device.

13. The mobile device of claim 12, wherein the state reply message further comprises a validity status indicator indicating whether the state request message was determined to be valid.

14. The mobile device of claim 12, wherein the remote control parental control command comprises at least one of turn off, stand by, lock all channels, lock current channel, and reset previous command state.

15. A content provider server for providing remote control of content rendered by a processing device, the content provider server comprising a processor and a memory storing a server module, which server module when executed causes the processor to:

receive a state request message from a controller in a mobile device for the processing device, said server module being located at the content provider server, said state request message requesting a status of said processing device;

locate said addressed processing device;

forward said state request message to said located processing device;

receive a state reply message from said located processing device, wherein said state reply message provides the status of said processing device;

forward said state reply message to said controller in said mobile device;

receive a remote control parental control command from said controller in said mobile device for said located processing device;

forward said remote control parental control command to said located processing device; and receive an acknowledgement of status of completion of said remote control parental control command to said controller in said mobile device, wherein the remote control parental control command is maintained until a reset option is selected on the mobile device.

16. The content provider server of claim 15, wherein the server module when executed further causes the processor to:

determine a validity of the state request message; and
send, to the controller in the mobile device, information indicating the determined validity.

17. The content provider server of claim 15, wherein the remote control parental control command comprises at least one of turn off, stand by, lock all channels, lock current channel, and reset previous command state.

18. A client processing device for providing remote control of content rendered by the client processing device, comprising a processor and a memory storing a client processing device module, which client processing device module when executed causes the processor to:

record information of events in said client processing device;

receive a state request message from a controller in a mobile device via a content provider server, said state request message requesting a status of said client processing device;

generate a state reply message including said recorded information and status of said client processing device;

transmit said state reply message to said controller in said mobile device via said content provider server;

receive a remote control parental control command from said controller in said mobile device via said content provider server;

perform an action specified by said remote control parental control command;

transmit an acknowledgement including status of performance of said action specified by said remote control parental control command to said controller in said mobile device via said content provider server; and maintain the remote control parental control command until a reset option is selected on the mobile device.

19. The client processing device according to claim 18, wherein said recorded information includes event names, channel names, event start times, event end times.

20. The client processing device module of claim 18, wherein the client set top box module when executed further causes the processor to:

determine a validity of the state request message; and
send, to the controller in the mobile device, information indicating the determined validity.

* * * * *